United States Patent [19]
Kobayashi et al.

[11] Patent Number: 5,700,529
[45] Date of Patent: Dec. 23, 1997

[54] SEAMLESS CAN AND A METHOD OF PRODUCING THE SAME

[75] Inventors: Akira Kobayashi, Chigasaki; Hideo Kurashima, Yokosuka; Harumi Sato, Yokohama; Satoshi Fujita, Yokohama; Katsuhiro Imazu, Yokohama, all of Japan

[73] Assignee: Toyo Seikan Kaisha, Ltd., Tokyo, Japan

[21] Appl. No.: 382,639

[22] Filed: Feb. 2, 1995

[30] Foreign Application Priority Data

Feb. 3, 1994 [JP] Japan .................................. 6-011886

[51] Int. Cl.$^6$ ................................ B32B 15/08; B65D 90/04
[52] U.S. Cl. .......................... 428/35.8; 428/458; 428/220; 220/415; 220/419; 220/458; 220/906; 220/DIG. 22; 72/46
[58] Field of Search ..................... 428/35.8, 35.9, 428/458, 480, 220; 220/906, 415, 418, 419, 456, 458, DIG. 22; 72/46, 47

[56] References Cited

U.S. PATENT DOCUMENTS

| | | | |
|---|---|---|---|
| 5,137,762 | 8/1992 | Aizawa et al. ...................... | 428/35.8 |
| 5,139,889 | 8/1992 | Imazu et al. ...................... | 220/456 |
| 5,144,824 | 9/1992 | Kobayashi et al. ...................... | 428/35.8 |
| 5,228,588 | 7/1993 | Aizawa et al. ...................... | 220/458 |
| 5,300,335 | 4/1994 | Miyazawa et al. ...................... | 428/35.8 |
| 5,360,649 | 11/1994 | Sato et al. ...................... | 428/35.8 |

*Primary Examiner*—Rena Dye
*Attorney, Agent, or Firm*—Sughrue,Mion,Zinn,Macpeak & Seas, PLLC

[57] ABSTRACT

A seamless can obtained by forming a laminated material of a metal and a polyester film into a cup such that a final draw ratio defined by H/D (H:height, D:diameter of the bottom portion) is not smaller than 1.5, wherein a polyester (A) on the bottom portion of the container has a biaxial orientation degree ($R_x$) of from 2.5 to 20 defined by the following formula (1), $$R_x = I_A/I_B \qquad (1)$$

and a polyester on the barrel portion of the container has a monoaxial orientation satisfying the following formula (2), $$0.55 < \cos^2 \phi < 1 - \exp[-0.45 I_A/I_B - 1.1\epsilon + 0.53] \qquad (2)$$

wherein $R_x$, $I_a$, $I_b$ and $\cos^2\phi$ are as defined in the specification, and a method of producing the same.

4 Claims, 8 Drawing Sheets

CHART OF IA/IB MEASUREMENT

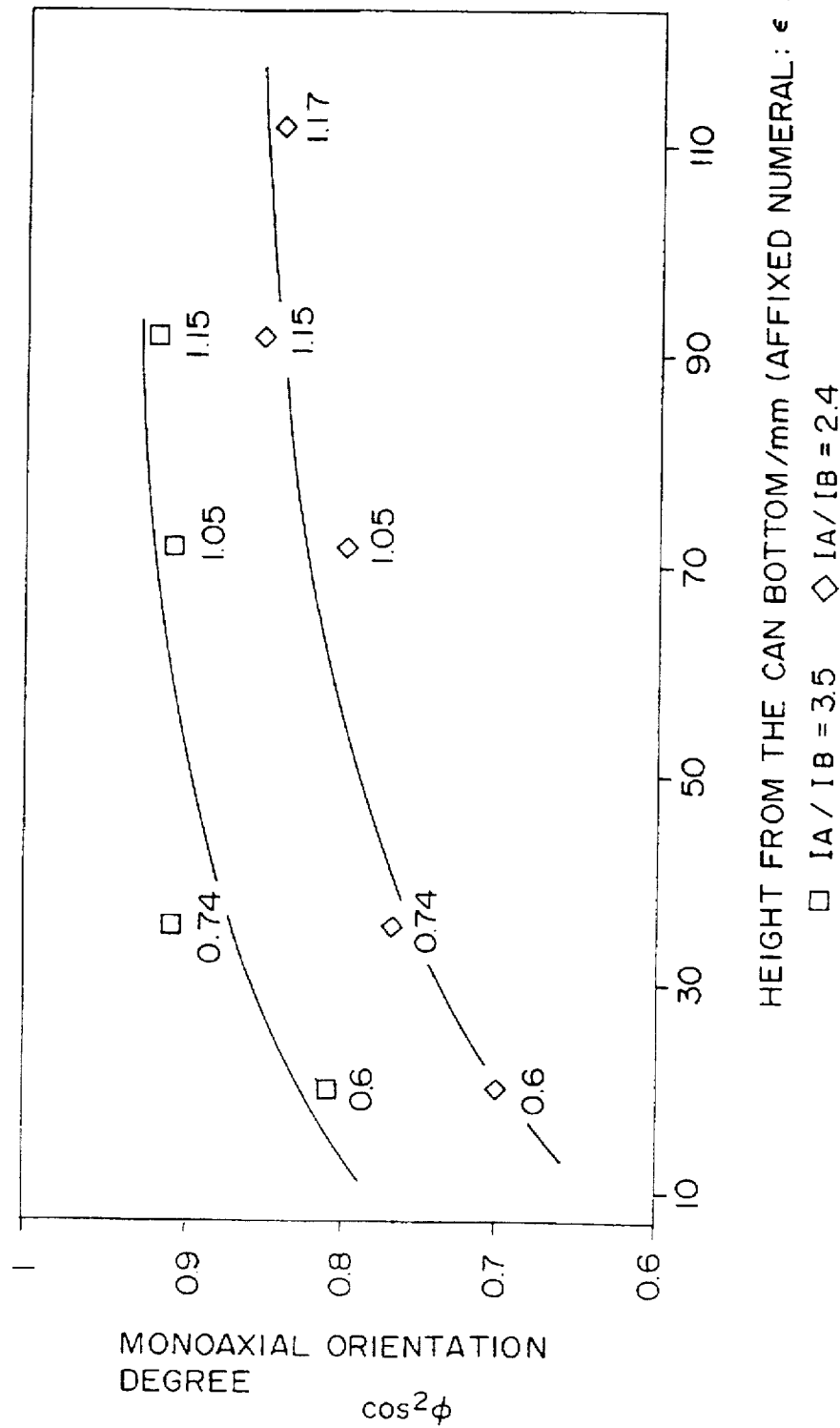

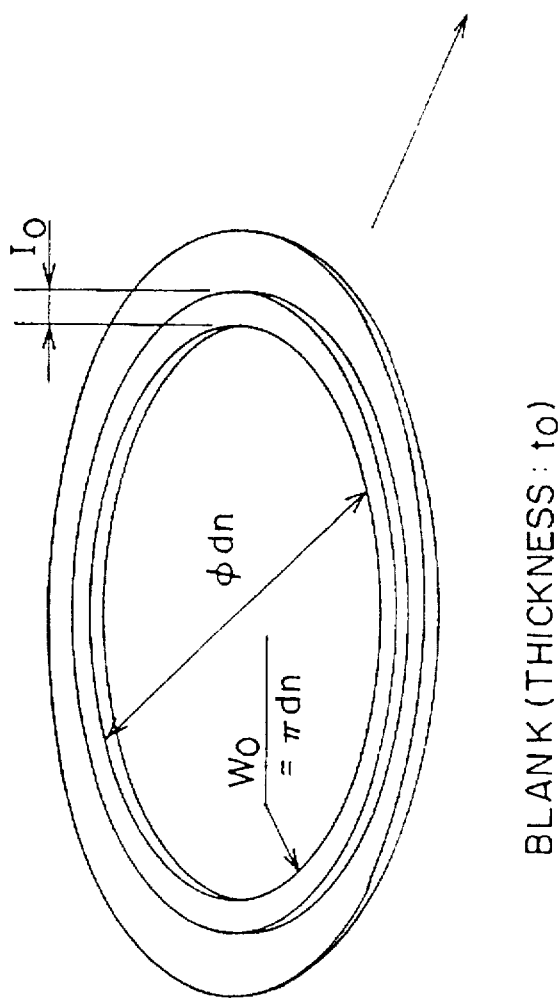
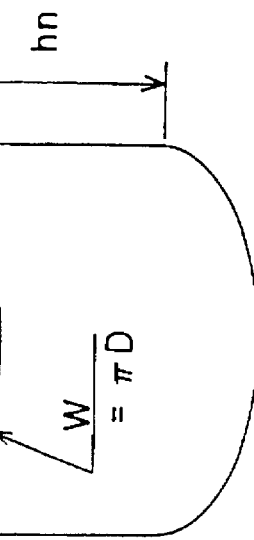
FIG. 6(a) BLANK (THICKNESS: t₀)
FIG. 6(b) BARREL
MODEL FOR CALCULATING STRAIN

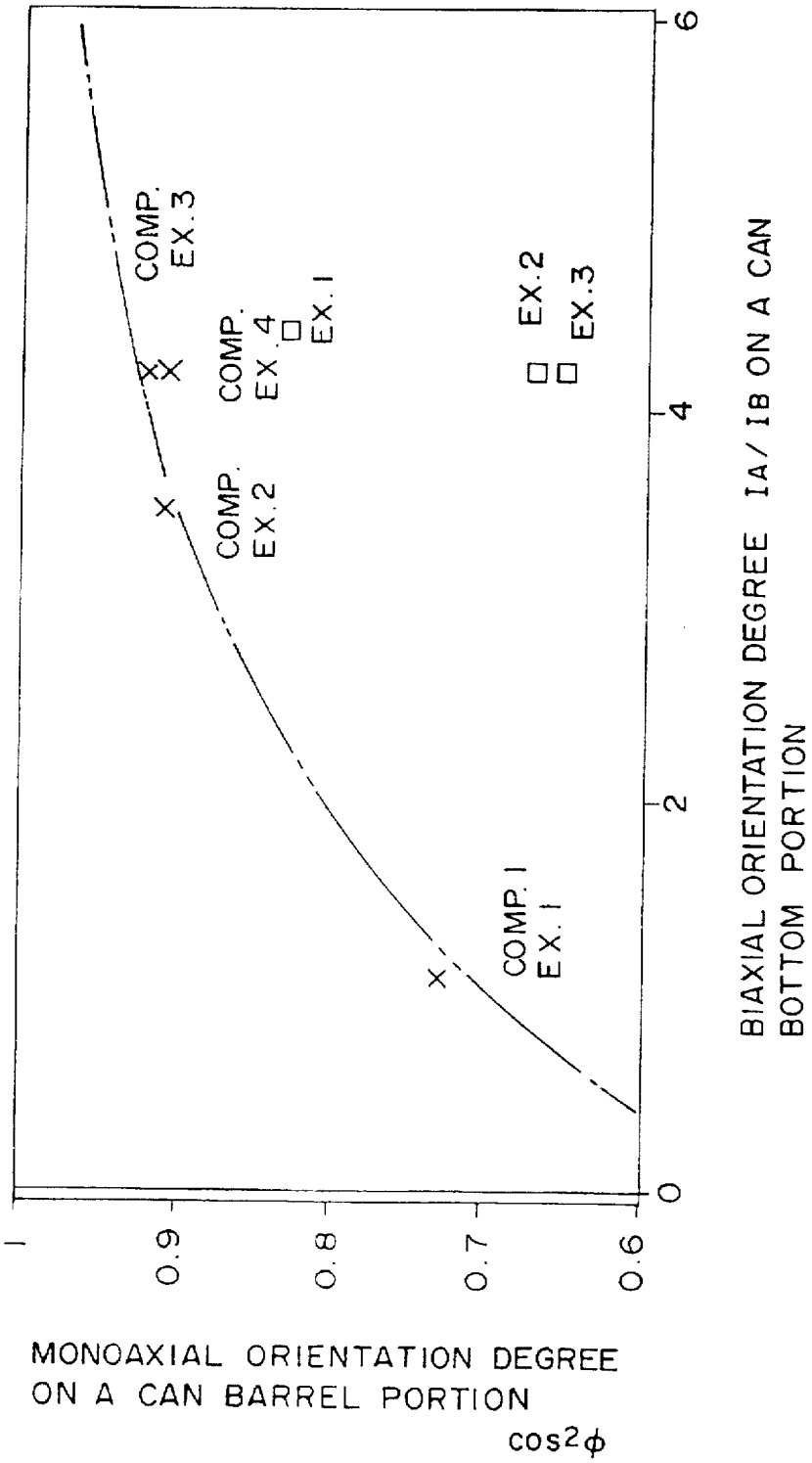

DEEP-DRAW-FORMED CAN (10) FOR REDUCING THICKNESS ACCORDING TO THE INVENTION

MONOAXIAL ORIENTATION DEGREE $< f(IA/IB, \epsilon)$

HIGH IA/IB

SEAMLESS CAN AND A METHOD OF PRODUCING THE SAME

BACKGROUND OF THE INVENTION

1. (Field of the Invention)

The present invention relates to a seamless can obtained by using a laminated material of a metal substrate and a polyester film, and to a method of producing the same. More specifically, the invention relates to a laminated seamless can wherein both the barrel portion and the bottom portion have resistance against the content and excellent flavor-retaining property, the barrel portion exhibits excellent adhesion property and workability, and the bottom portion exhibits excellent shock resistance (dent resistance), and to a method of producing the same.

2. (Description of the Prior Art)

Side seamless cans have heretofore been obtained by subjecting a metal blank such as an aluminum plate, a tin plate, a tin-free steel plate or the like plate to at least one stage or plural stages of draw working between a drawing die and a punch in order to form a cup that has a barrel portion without seam on the side surface thereof and a bottom portion which is integrally connected to the barrel portion without forming seam, and then, as required, subjecting the barrel portion to the ironing between the ironing punch and the die in order to reduce the thickness of the barrel of the container. There has further been widely known a deep-draw working according to which the side wall portion is bent and elongated along the curved corner portion of the redrawing die in order to reduce the thickness of the side wall portion (Japanese Laid-Open Patent Publication No. 501442/1981).

The method of coating a side seamless can with an organic film is represented by a method of laminating a resin film in advance on a metal blank which has not been formed, in addition to a widely accepted method of applying an organic paint onto the can that has been formed. Japanese Patent Publication No. 34580/1984 discloses the use of a material which is obtained by laminating a polyester film derived from terephthalic acid and tetramethylene glycol onto a metal blank. In producing redraw-formed cans by bend-elongation, furthermore, there has been known to use a metal plate which is coated with vinyl organosol, epoxy, phenolics, polyester, acryl or the like.

Japanese Laid-Open Patent Publication No. 101930/1991 discloses a coated metal plate for draw-formed cans, comprising a laminated material of a metal plate, a polyester film layer of chiefly an ethylene terephthalate unit and, as required, an adhesive primer layer interposed between the metal plate and the polyester film layer, wherein the polyester film layer has an X-ray diffraction intensity ratio as defined by, $$R_X = I_A / I_B$$

wherein $I_A$ is an X-ray diffraction intensity by a diffraction plane which is in parallel with the polyester film surface and has a spacing of about 0.34 nm (CuKα X-ray diffraction angle of from 24° to 28°, and $I_B$ is an X-ray diffraction intensity by a diffraction plane which is in parallel with the polyester film surface and has a spacing of about 0.39 nm (CuKα X-ray diffraction angle of from 21.5° to 24°, of from 0.5 to 15 and has an anisotropy index of in-plain orientation of crystals of not larger than 30, as well as a thickness-reduced draw-formed can obtained by using the above coated metal plate and reducing the thickness of the side wall of barrel by bend-elongation.

By using the metal blank having a resin coating, however, the metal blank is subject to be damaged by tools in the step of deep-draw-forming, in the step of deep-draw-forming for reducing the thickness and in the step of ironing working. In the portions where the coating is damaged, the metal is exposed actually or latently and is eluted or corroded at such portions. In producing the seamless cans, furthermore, there takes place such a plastic flow that the size increases in the direction of height of the can but the size contracts in the circumferential direction of the can. As there takes place the plastic flow, however, the adhesive force decreases between the metal surface and the resin coating and, besides, the adhesive force between them decreases with the passage of time due to strain remaining in the resin coating. Such a tendency becomes conspicuous particularly when the content is hot-canned or when the canned content is sterilized at low temperatures or high temperatures.

According to the above Japanese Laid-Open Patent Publication No. 101930/1991, cracks and pinholes are prevented from occurring even under severe conditions of deep-draw-forming, improved workability and corrosion resistance are obtained, and adhesive force between the metal blank and the coated film is not lost even when the metal blank undergoes a plastic flow, due to the fact that the polyester film layer of the laminated material has an X-ray diffraction intensity ratio ($I_A/I_B$) within a range of from 0.5 to 15 and, particularly, from 0.5 to 10, and has an anisotropy index of in-plain orientation of crystals of not larger than 30. It was, however, found that when the above coated metal plate is used for producing seamless cans by thickness-reducing deep-draw-forming or ironing working, there still remain problems that must be solved.

In the canned products, in practice, the bottom of the can and the coating structure in its vicinities are important. In particular, excellent dent resistance is required. This will be described below. The canned products are subjected to a practical testing which is a denting test giving impact to the can to such a degree that a scar of impact is formed, in order to test whether the coating of the can is maintained in a complete state or not even when the scar of impact is formed. This is because, in practice, the canned products may often fall and receive impact or may often collide with one another. Even in such cases, the coating on the inner surfaces should not be peeled off, and defects such as cracks and pinholes should not develop. In the canned products, the bottom of the can is most liable to develop scar due to impact. It is therefore particularly important that the coating on the bottom portion has excellent dent resistance.

In a seamless can using a laminated material, the degree of working greatly differs depending upon the barrel portion and the bottom portion; i.e., a large plastic flow develops in the barrel portion but the plastic flow in the bottom portion is as small as that of doming.

It was found that the can made of a laminated material having resistance against the plastic flow and excellent adhesiveness and workability disclosed in the above-mentioned publication still lacks dent resistance in the bottom portion.

With the conventional deep-draw-formed cans having side wall of barrel of which the thickness is reduced by bend-elongation, the degree of reducing the thickness of the side wall of barrel portion is about 20% at the greatest. Therefore, it has been very desired to reduce the thickness of the barrel portion by 30% or more from the standpoint of decreasing the cost of metal blank and reducing the weight of the can. In order to reduce the thickness of the barrel portion, the degree of biaxial orientation of the polyester film of the laminated material must be further relaxed. When the degree of biaxial orientation is relaxed, however, the dent resistance on the bottom of the can becomes further deteriorated.

SUMMARY OF THE INVENTION

It is therefore an object of the present invention to provide a laminated seamless can of which both the barrel portion and the bottom portion have resistance against the content and excellent flavor-retaining property, of which the barrel portion exhibits excellent adhesiveness and workability and of which the bottom portion has excellent shock resistance (dent resistance), and a method of producing the same.

Another object of the present invention is to provide a seamless can which maintains the above-mentioned excellent properties in combination even when the thickness of the barrel wall is reduced to a high degree, and a method of producing the same.

According to the present invention, there is provided a method of producing seamless cans using a laminated plate obtained by heat-adhering a polyester film onto a metal substrate, wherein a polyester (A) of the laminated plate of a portion corresponding to the bottom of the container has a biaxial orientation degree ($R_X$) defined by the following formula (1), $$R_X = I_A/I_B \tag{1}$$

wherein $I_A$ is a diffraction intensity by a diffraction plane having a spacing of about 0.34 nm (CuKα X-ray diffraction angle is from 24° to 28°) in parallel with the polyester film surface on the bottom portion, and $I_B$ is a diffraction intensity by a diffraction plane having a spacing of about 0.39 nm (CuKα X-ray diffraction angle is from 21.5° to 24°) in parallel with the polyester film surface on the bottom portion, of from 2.5 to 20, a polyester (B) of a portion corresponding to the upper portion of the container barrel has a biaxial orientation degree ($R_X$) which is lower by at least 5% than the biaxial orientation degree of said polyester (A), and said laminated plate is formed into a cup such that H/D (H:height, D:diameter of the bottom portion) is not smaller than 1.5.

According to the present invention, furthermore, there is provided a method of producing seamless cans using a laminated plate obtained by heat-adhering a polyester film onto a metal substrate, wherein a polyester (C) of the laminated plate has a biaxial orientation degree ($R_X$) defined by the following formula (1), $$R_X = I_A/I_B \tag{1}$$

wherein $I_A$ is a diffraction intensity by a diffraction plane having a spacing of about 0.34 nm (CuKα X-ray diffraction angle is from 24° to 28°) in parallel with the polyester film surface on the bottom portion, and $I_B$ is a diffraction intensity by a diffraction plane having a spacing of about 0.39 nm (CuKα X-ray diffraction angle is from 21.5° to 24°) in parallel with the polyester film surface on the bottom portion, of from 2.5 to 20, and the laminated plate is formed into a cup such that H/D (H:height, D:diameter of the bottom portion) is not smaller than 1.5 while heat-treating the barrel portion only in a step of forming the laminated plate into the cup in order to relax the monoaxial orientation of the polyester.

According to the present invention, furthermore, there is provided a seamless can obtained by forming a laminated material of a metal and a polyester film into a cup such that a final draw ratio defined by H/D (H:height, D:diameter of the bottom portion) is not smaller than 1.5, wherein a polyester (A) on the bottom portion of the container has a biaxial orientation degree ($R_X$) defined by the following formula (1), $$R_X = I_A/I_B \tag{1}$$

wherein $I_A$ is a diffraction intensity by a diffraction plane having a spacing of about 0.34 nm (CuKα X-ray diffraction angle is from 24° to 28°) in parallel with the polyester film surface on the bottom portion, and $I_B$ is a diffraction intensity by a diffraction plane having a spacing of about 0.39 nm (CuKα X-ray diffraction angle is from 21.5° to 24°) in parallel with the polyester film surface on the bottom portion, of from 2.5 to 20, and a polyester (B) on the barrel portion of the container has a monoaxial orientation satisfying the following formula (2), $$0.55 < \cos^2\phi < 1 - \exp[0.45 I_A/I_B - 1.1\epsilon + 0.53] \tag{2}$$

wherein $\cos^2\phi$ is an index representing the degree of monoaxial orientation of the polyester film at a portion where the barrel portion is measured, and is given by the formula (3), $$\cos^2\phi = \frac{\int_{-90°}^{+0°} I(\phi)\cos^2\phi \, d\phi}{\int_{-90°}^{+0°} I(\phi) \, d\phi} \tag{3}$$

wherein $I(\phi)$ is an X-ray diffraction intensity at an angle $\phi$ by a diffraction plane (plane index of −105) having a spacing of about 0.21 nm (CuKα X-ray diffraction angle of from 41° to 45°) at right angles with the polyester film surface, $\phi$ is a value represented by the β-scanning angle of X-ray diffraction up to −90° presuming that the angle of structural inclination between a vector of a normal on the diffraction plane and a polyester fiber axis is zero with respect to the direction of height of the can, $I_A$ is a diffraction intensity by a diffraction plane having a spacing of about 0.34 nm (CuKα X-ray diffraction angle is from 24° to 28°) in parallel with the polyester film surface on the bottom portion of the can, $I_B$ is a diffraction intensity by a diffraction plane having a spacing of about 0.39 nm (CuKα X-ray diffraction angle is from 21.5° to 24°) in parallel with the polyester film surface on the bottom portion of the can, and $\epsilon$ is considerable strain by the processing of the laminated material at the can body measuring portion, and preferably satisfying the following formula (4), $$0.6 < \cos^2\phi < 0.95 - \exp[-0.45 I_A/I_B - 1.1\epsilon + 0.53] \tag{4}$$

BRIEF DESCRIPTION OF THE DRAWINGS

FIG. 5 is a graph illustrating a relationship between the monoaxial orientation index $\cos^2\phi$ and the height at portions of various heights of the can barrel portion;

FIG. 6 is a diagram explaining the generation of strain in relation to the blank and the can barrel;

FIG. 7 is a graph plotting a variety of data, wherein the abscissa represents the biaxial orientation degree $I_A/I_B$ of polyester at the can bottom portion and the ordinate represents the monoaxial orientation index $\cos^2\phi$ of polyester at the can barrel portion;

DETAILED DESCRIPTION OF THE INVENTION

In producing the seamless can according to the present invention, a laminated plate obtained by heat-adhering a polyester film onto a metal substrate is formed into a cup such that H/D (H:height, D:diameter of the bottom portion) is not smaller than 1.5. Here, a distinguished feature resides in that a polyester (A) of the laminated plate at a portion corresponding to the container bottom portion is biaxially orientated and a polyester (B) corresponding to the container barrel portion has a biaxial orientation degree smaller than that of the polyester (A).

Figure 1:
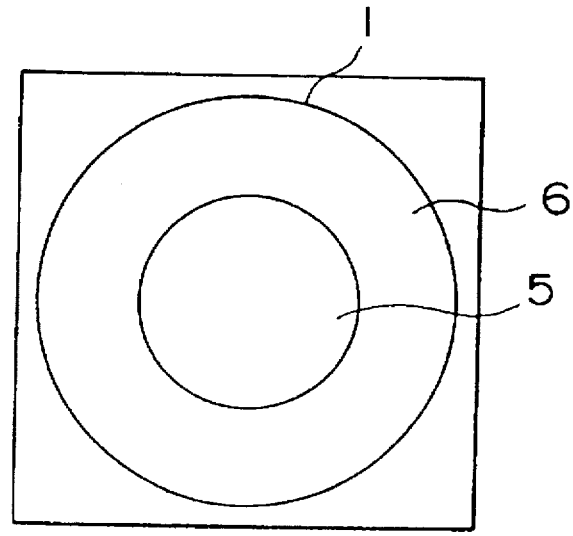
FIG. 1 is a plan view of a laminated plate.
Figure 2A:
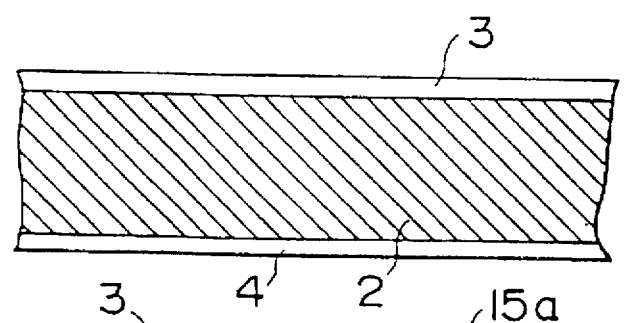
FIG. 2(a) is a sectional view of the laminated plate of FIG. 1 on an enlarged scale.
Figure 2B:
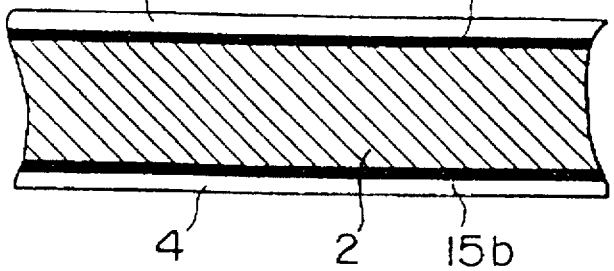
FIG. 2(b) is a sectional view illustrating another example.
Figure 3:
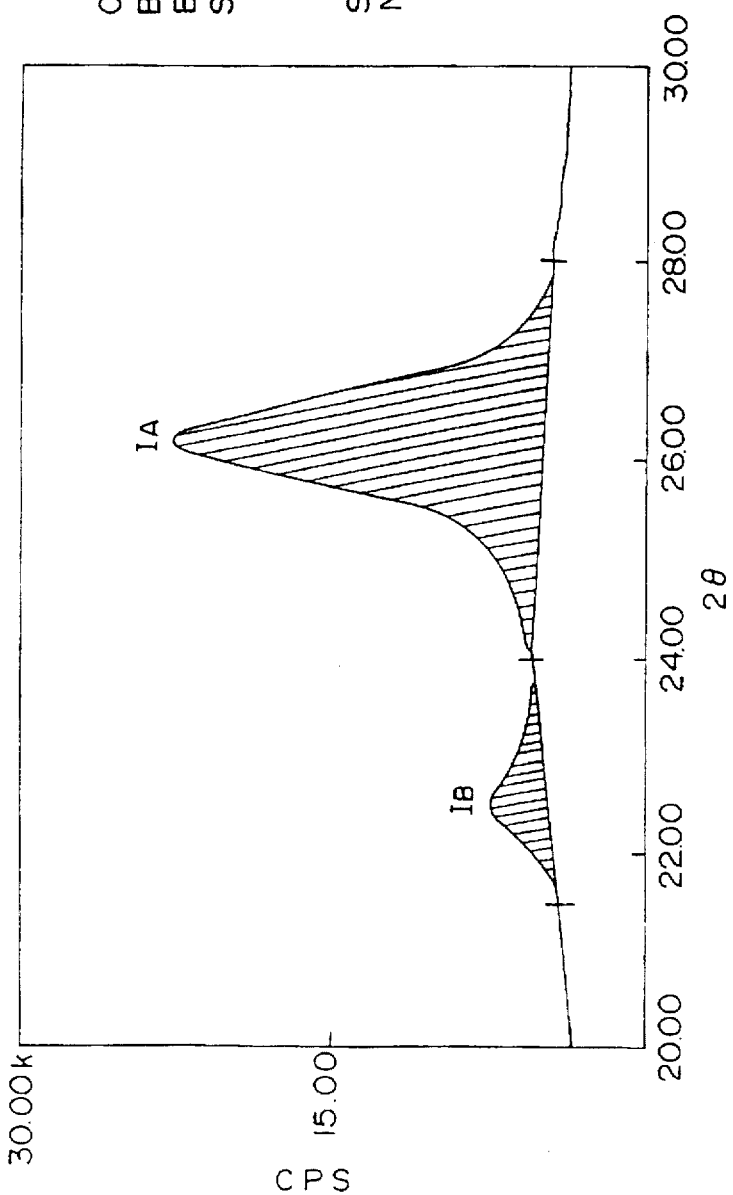
FIG. 3 is a diagram of X-ray diffraction for explaining a method of measuring the biaxial orientation degree of a polyester.

Referring to FIG. 1 (plan view), FIG. 2(a) (enlarged view) and FIG. 2(B) (enlarged view of another example) illustrating the laminated plate used in the present invention, a blank 1 used for forming the can comprises a laminate of a metal substrate 2, and an inner layer 3 and an outer layer 4 of a polyester film that are heat-adhered thereto (see FIGS. 2(a) and 2(B)). Here, as shown in FIG. 1, the blank 1 includes a portion 5 formed on the container bottom portion and a portion 6 formed on the container barrel portion which is on the outer periphery thereof.

According to the present invention, the orientation degree of the polyester film of the blank 1 is so distributed that a polyester (A) of a portion corresponding to the container bottom portion is maintained in a highly biaxially oriented state and a polyester (B) of a portion corresponding to the container barrel portion is maintained in a lowly biaxially oriented state.

In deep-draw-forming the laminated plate into a cup, in deep-draw-forming the laminated plate to reduce the thickness by bending and elongating the barrel portion, or in effecting the ironing in addition to the above forming, the can barrel portion can be smoothly pulled and deformed (flown) in the axial direction of the can or can be compressed and deformed (flown) in the radial direction of the can without causing the film layer to be damaged or without developing pinholes or cracks since the biaxial orientation of the polyester has been relaxed. Besides, not only the bend-elongation or the reduction of thickness by ironing can be easily effected but also the polyester film exhibits excellent adhesiveness to the metal substrate even after the forming has been finished and further withstands the subsequent workings such as necking, beading, flanging, wrap-seaming, etc.

In the container bottom portion where the polyester is maintained in a highly biaxially oriented state, on the other hand, the film maintains excellent shock resistance, and is not peeled off, is not damaged, or does not develop cracks or pinholes even when it is dented. Furthermore, the film on the bottom portion is maintained in the biaxially oriented state, and exhibits excellent barrier property against corrosive components such as various ions, absorbs little the flavor components of the content, and exhibits excellent resistance against the content. Being biaxially oriented, furthermore, the polyester film on the container bottom portion is not thermally crystallized (lamellar is not formed) even when it is subjected to the heat-treatment (e.g., drying of printing ink) during the step of producing cans or to the heat-treatment (hot-packing or sterilization by heating) after the content is packaged and, hence, excellent toughness and intimate adhesiveness are maintained.

Biaxial orientation of the polyester is relaxed on the portion of the laminated blank corresponding to the barrel portion. However, the polyester of this portion is imparted with monoaxial orientation as the laminated plate is formed into a cup by the deep-draw-forming, by the thickness-reducing deep-draw-forming by bending and elongating the barrel portion, or by the ironing which is effected in addition to the above forming. The monoaxial orientation enables the polyester film to exhibit barrier property against the corrosive components and helps prevent the polyester film from adsorbing flavor components of the content, contributing, as a result, to improving the resistance of the can barrel portion against the content.

These facts will become readily obvious if reference is made to the results of Table 1 appearing later. For instance, when the biaxial orientation of the whole polyester of the blank is relaxed (Comparative Example 1), the barrel portion remains normal but the bottom portion is cracked due to impact when the laminated blank is deep-draw-formed to a high degree to reduce the thickness. When the whole polyester of the blank has a uniform biaxial molecular orientation (Comparative Examples 2 and 3), on the other hand, the film is broken or, even when the film is not broken, the underfilm corrosion (UFC) takes place in the barrel portion when the laminated blank is deep-draw-formed to a high degree to reduce the thickness. On the other hand, when the polyester is biaxially oriented to suitable degrees depending upon the portions corresponding to the bottom portion and the barrel portion (Example 1) in accordance with the present invention, the workability and adhesiveness of the barrel portion can be improved while preventing the film from being cracked by impact on the bottom portion.

According to the present invention, the portion of the blank corresponding to the bottom portion does not mean that this portion strictly corresponds to the bottom of the container but means that the bottom of the container is formed from the portion corresponding to the bottom portion. Therefore, the lower portion of the container barrel may be formed from the portion of the blank corresponding to the bottom portion.

According to the present invention, particularly distributed biaxial orientation degrees can be imparted to the blank that is used, or even during any step such as during the deep-draw-forming, thickness-reducing deep-draw-forming or ironing effected in addition to the above steps, or between the above-mentioned forming steps. That is, in forming the blank into a cup according to the present invention, the blank is subjected to the severest conditions during the thickness-reducing deep-draw-forming of the cup barrel by bend-elongation or during the ironing. However, if the barrel portion is heat-treated in order to relax a high degree of monoaxial orientation induced by the high degree of biaxial orientation in the film of the barrel portion, then, the monoaxial orientation in the film of the container barrel portion is relaxed while leaving the biaxial orientation of the film on the container bottom portion unchanged, making it possible to accomplish the actions and effects same as those mentioned above. In Examples 2 and 3 in Table 1, the monoaxial orientation in the barrel portion is relaxed during the deep-draw-forming for reducing the thickness, exhibiting the same advantages as those of relaxing the orientation of the blank (Example 1).

Figure 9:
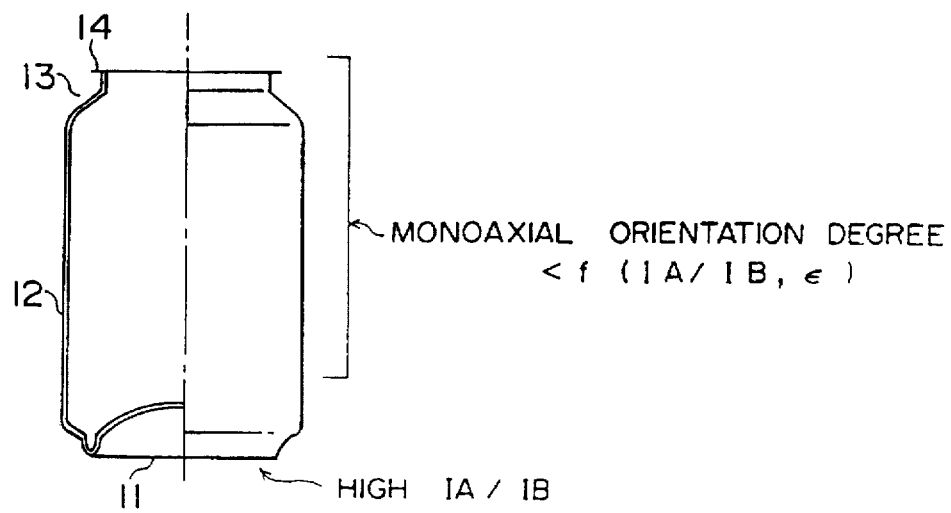
FIG. 9 is a side view showing a seamless can partly in cross section.

The seamless can according to the present invention has novel orientation characteristics as shown in FIG. 9 in relation to the above-mentioned production method.

First, the biaxial orientation degree ($R_X$) of the polyester film is given by a relation (1), $$R_X = I_A/I_B \qquad (1)$$

wherein $I_A$ is a diffraction intensity in an index of a plane (100) and $I_B$ is a diffraction intensity in an index of a plane (−110) which are found from the above-mentioned X-ray diffraction.

More specifically, $I_A$ and $I_B$ are found as described below.
(Method of measuring $I_A/I_B$)

The sample to be measured is obtained from the bottom portion of the container.

Measurement is taken as described below by using an X-ray diffractometer.

The measuring conditions consist of using copper (wavelength λ=0.1542 nm) for an X-ray bulb (target), selecting a bulb voltage and a bulb current to be about 30 KV and about 100 mA, selecting a light-receiving slit having a slit width of smaller than 0.1° in terms of an angle so that there can be separately obtained two diffraction peaks of a diffraction plane having a spacing of about 0.39 nm (2θ is nearly 22.5°) and of a diffraction plane having a spacing of 0.34 nm (2θ is nearly 26°), mounting the sample such that the angle of incidence and angle of reflection of X-rays are, respectively, θ for the diffraction angle 2θ and that the incident X-rays and diffracted X-rays are symmetrical with respect to the normal on the film surface, scanning the diffraction angle 2θ over 20° to 30° while maintaining the angle of incidence θ and the angle of reflection θ to be constant at all times, and then measuring the X-ray diffraction spectra.

Integrated intensities (peak areas) $I_B$ and $I_A$ of diffraction on the diffraction plane having a spacing of about 0.39 nm (2θ is nearly 22.5°) and of diffraction on the diffraction plane having a spacing of about 0.34 nm (2θ is nearly 26°) are found, and an intensity ratio $I_A/I_B$ is calculated. The integrated intensities $I_A$ and $I_B$ are found as shown by drawing a straight line between the intensities where 2θ=24° and 28° and drawing a straight line between the intensities where 2θ=21.5° and 24° to regard these straight lines as backgrounds. The hatched areas from which the backgrounds are subtracted represent intensities.

In the present invention, the polyester film on the can bottom portion has a biaxial orientation degree ($R_X$) of from 2.5 to 20 and, particularly, from 2.8 to 20. The biaxial orientation degree plays an important role in relation to the dent resistance and resistance against the content of the bottom. When the biaxial orientation degree is lower than the above-mentioned range, the dent resistance of the bottom and the resistance against the content decrease. When the biaxial orientation degree is larger than the above-mentioned range, on the other hand, adhesiveness to the metal substrate decreases.

The monoaxial orientation of the polyester film of the can barrel portion is expressed by a monoaxial orientation index $\cos^2\phi$ of the above-mentioned formula. Here, the novel feature resides in that the monoaxial orientation index $\cos^2\phi$ is suppressed to lie within a range that satisfies the above-mentioned inequality (2) and, particularly, the above-mentioned inequality (4) in relation to the biaxial orientation degree $I_A/I_B$ of the polyester on the can bottom portion and the corresponding strain ε caused by working the can barrel portion.

The monoaxial orientation degree index $\cos^2\phi$ is calculated from the above-mentioned formula (3) and, if mentioned in further detail, is found by a method described below.

(Method of measuring monoaxial orientation degree)

Apparatus: X-ray diffraction apparatus (using Cu target and ball figure attachment)

Measuring method: The film isolated from the can barrel of the finally obtained can (using a 50% diluted hydrochloric acid) is measured by an α=0° transmission method with β-scanning (β=90°: axial direction). In this case, 2θ is 43° which is a diffraction angle of a plane (−105) in which the normal on the plane is nearly in parallel with the fiber axis.

Data processing: based on the assumption that β=82°→φ= 0°(8° is a deviation between the plane and the axis).

$$\cos^2\phi = \frac{\int_{-90°}^{+0'} I(\phi)\cos^2\phi\, d\phi}{\int_{-90°}^{+0'} I(\phi)\, d\phi} \qquad (3)$$

Figure 4:
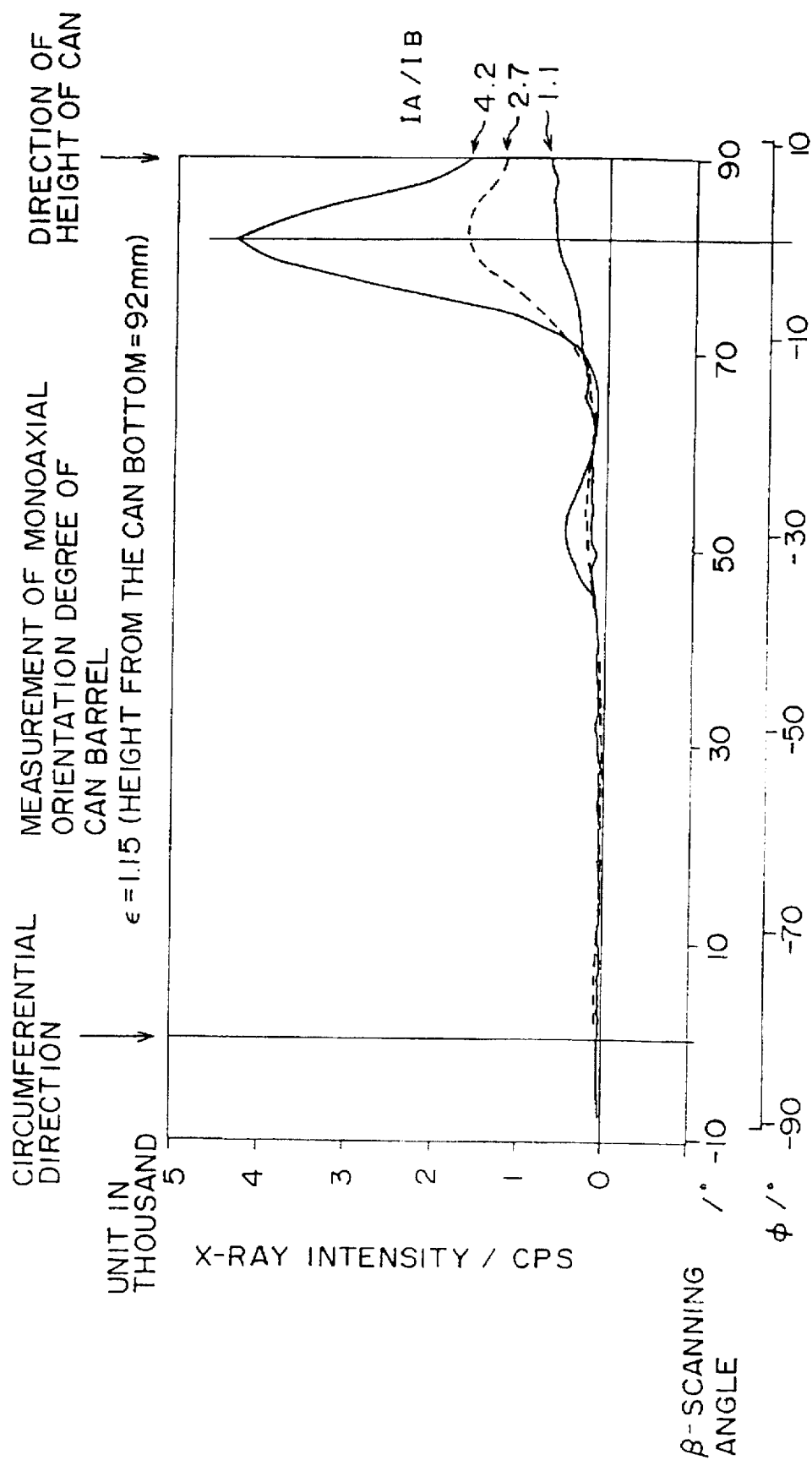
FIG. 4 is a graph illustrating a relationship between the β-scanning angle and the diffraction intensity using a polyester film of a can barrel portion.

FIG. 4 is a graph illustrating a relationship between the β-scanning angle and the diffraction intensity of the polyester film on the can barrel portion, and FIG. 5 is a graph showing a relationship between $\cos^2\phi$ and the height at various portions of the can barrel.

The index $\cos^2\phi$ is 1 when the orientation is a perfect monoaxial orientation in the direction of height, ½ when the orientation is random, and is 0 when the orientation is in the circumferential direction of the can (this would not happen with the draw-formed cans).

The corresponding strain ε due to the working is caused when the blank is formed into a can barrel, and is calculated from strain εt in the plate thickness, strain εφ in the direction of height and strain εθ in the circumferential direction. The corresponding strain ε is calculated according to a method described below.

(Method of calculating corresponding strain ε due to working)

The corresponding strain ε is calculated as a non-dimensional value from strain εt in the plate thickness, strain εφ in the direction of height and strain εθ in the circumferential direction in compliance with the equation (5), $$\epsilon = \sqrt{2(\epsilon_t^2 + \epsilon_\phi^2 + \epsilon_\theta^2)/3} \qquad (5)$$

Referring to a diagram (FIG. 6) for calculating strain, the corresponding strain due to the working is found as described below based on the assumption that a portion at a given diameter position dn having a circumferential length $w_0$ of blank, a unit length $l_0$ in the radial direction and a thickness $t_0$ has changed into a shape having a circumferential length w, a height l and a thickness t on the can barrel at a height hn from the can bottom: i.e., Strain in the blank thickness: $\epsilon t = \ln(t/t_0)$ Strain in the height (radial) direction: $\epsilon\phi = \ln(l/l_0)$ Strain in the circumferential direction: $\epsilon\theta = \ln(w/w_0)$ where $$\epsilon_\tau + \epsilon_\phi + \epsilon_\theta = 1$$

Measurement of can barrel:

Initial blank thickness: $t_0$ (chiefly can bottom)

Can diameter: D→circumferential length of can: $\pi D$

Height from can bottom: blank thickness ti at hi

↓

Strain at a point hn at a given height of can barrel $$\epsilon\, t_n = l_n(t_n/t_0)$$
$$\epsilon\theta_n = l_n(W_n/W_0)$$
$$W_n = \pi D$$

$$V_n = \left(\frac{\pi D^2}{4}\right) * t_0 + \int_0^{hn} \pi D t_1 dh_1$$

↑     ↑     ↑
volume up   volume of   volume of
to height $h_n$   bottom   barrel
    portion   portion When $V_n$ is a blank, the diameter $d_n$ is, $$d_n = V_n \times [4/(\pi t_0)]$$

and hence, $$W_0 = \pi d_n = 4V_n/t_0$$

$$\epsilon_{\theta_n} = -(\epsilon_{t_n} + \epsilon_{\theta_n})$$

In a seamless can formed into a cup, the degree of working increases with an increase in the height of the can barrel portion, and strain $\epsilon$ increases correspondingly.

FIG. 7 is a graph plotting a variety of data wherein the abscissa represents the biaxial orientation degree $I_A/I_B$ of the polyester on the can bottom portion and the ordinate represents the monoaxial orientation index $\cos^2$ of the polyester of the can barrel portion.

Figure 8:
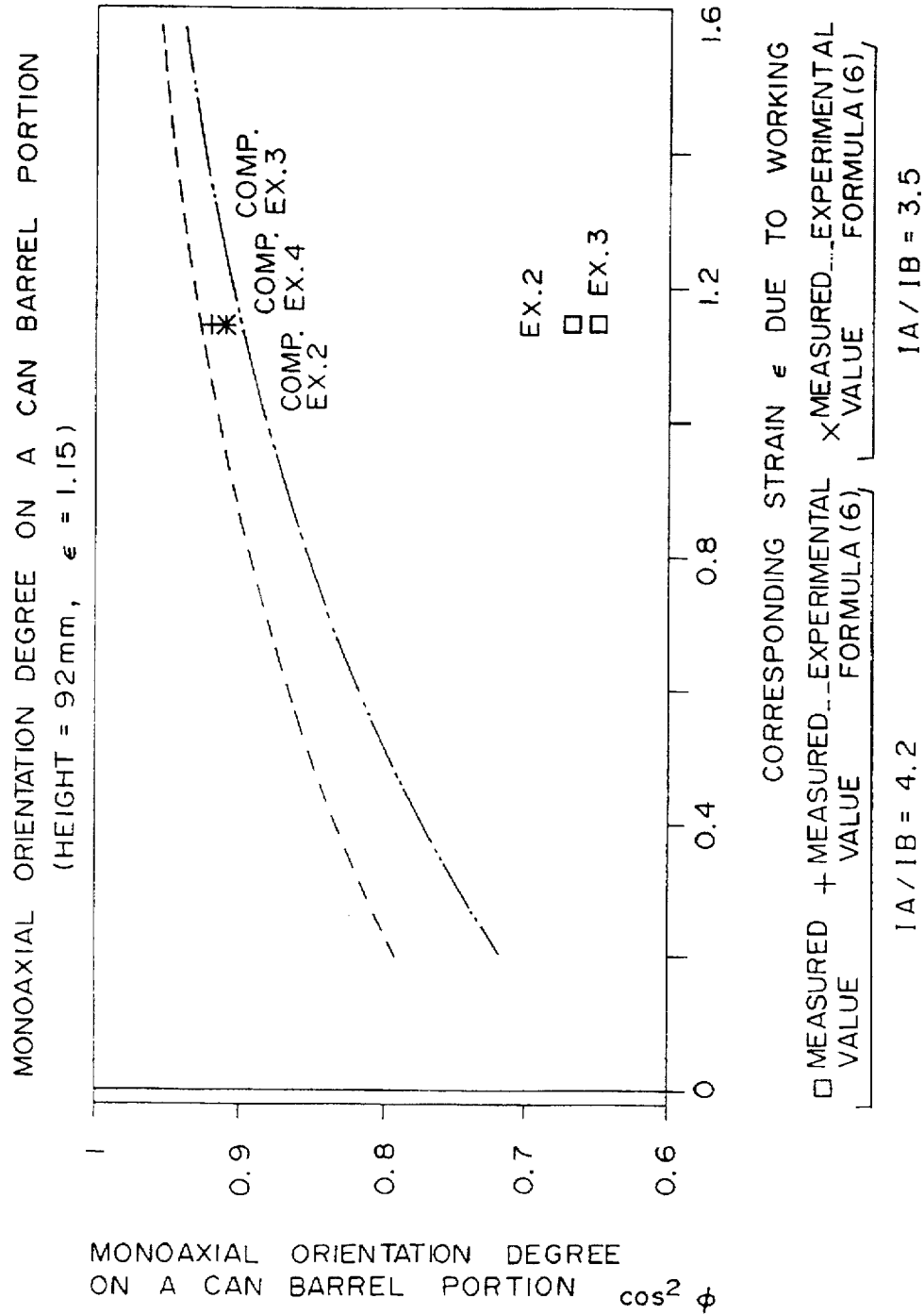
FIG. 8 is a graph plotting a variety of data while changing the biaxial orientation degree $I_A/I_B$ of polyester at the can bottom portion, wherein the abscissa represents the corresponding strain ε caused by the working on the can barrel portion and the abscissa represents the monoaxial orientation index $\cos^2\phi$ of polyester at the can barrel portion.

FIG. 8 is a graph plotting a variety of data while changing the biaxial orientation degree $I_A/I_B$ of the polyester on the can bottom portion wherein the abscissa represents the corresponding strain $\epsilon$ due to working the can barrel portion and the ordinate represents the monoaxial orientation index $\cos^2$ of the polyester of the can barrel portion.

In FIGS. 7 and 8, curves are in compliance with the formula (6), $$\cos^2 \phi = 1 - \exp[-0.45 I_A/I_B - 1.1\epsilon + 0.53] \quad (6)$$

From these results, when the monoaxial orientation index $\cos^2$ of the polyester on the can barrel portion is equal to the right side of the formula (2) or (6), i.e., when the monoaxial orientation index $\cos^2$ is positioned on a line of the formula (6), the film is broken during the forming or even if the blank could be formed, the film peels off or microcracks and pinholes develop causing the adhesiveness and corrosion resistance to decrease. These defects, however, can be overcome by suppressing the monoaxial orientation index of the polyester on the can barrel to satisfy the formula (2) and, preferably, to satisfy the formula (4).

In the formula (2), the monoaxial orientation index $\cos^2\phi$ is specified to be larger than 0.55 in order to improve the resistance of the polyester on the can barrel against the content.

From FIGS. 7 and 8, furthermore, the monoaxial orientation index $\cos^2\phi$ increases with an increase in the corresponding strain $\epsilon$ due to the working. According to the present invention, however, the monoaxial orientation index $\cos^2\phi$ is suppressed to a small value despite an increase in the corresponding strain $\epsilon$, enabling the thickness, which was so far reduced by about 20% at the greatest, to be reduced by more than 30% and, particularly, up to 40% by the deep-draw-forming and, at the same time, making it possible to reduce the cost of blank and to reduce the weight of the container.

In deep-draw-forming the blank such that H/D (H:height, D:diameter of the bottom portion) is not smaller than 1.5 to reduce the thickness, furthermore, the film exhibits improved workability preventing the development of cracks and pinholes.

Referring to FIG. 9 illustrating a seamless can of the present invention, this seamless can 10 is obtained by deep-draw-forming (draw-forming and deep-draw-forming) the above-mentioned coated metal plate to reduce the thickness, and comprises a bottom portion 11 and a barrel side wall portion 12. As required, a flange portion 14 is formed at an upper end of the side wall portion 12 via a neck portion 13. In this can 10, the side wall portion 12 has a reduced thickness compared with the bottom portion 11 due to bend-elongation.

The side wall portion 12 has the same cross-sectional structure as that of the laminated plate shown in FIG. 2(a); i.e., the side wall portion 12 comprises a metal substrate 2, an inner film 3 of polyester formed on one surface thereof, and an outer film 4 formed on the other surface thereof. Referring to FIG. 2(b) illustrating another example of the cross-sectional structure, the structure is the same as that of FIG. 2(a) except that an adhesive layer 15a is interposed between the surface of the metal and the inner film 3 and an adhesive layer 15b is interposed between the surface of the metal and the outer film 4.

Even in these cases, the cross-sectional structure of the bottom portion 11 is the same as the cross-sectional structure of the side wall portion 12.

(Metal blank)

According to the present invention, a variety of surface-treated steel plates and light metal plates such as of aluminum can be used as a metal plate.

The surface-treated steel plate may be the one obtained by annealing a cold-rolled steel plate, subjecting it to the secondary cold-rolling, and effecting one or two or more kinds of surface treatment such as zinc plating, tin plating, nickel plating, electrochromate treatment and chromate treatment. A preferred example of the surface-treated steel plate will be an electrochromate-treated steel plate having a metal chromium layer at a rate of from 10 to 200 mg/m² and a chromate layer at a rate of from 1 to 50 mg/m² (reckoned as metal chromium). This surface-treated steel plate exhibits excellent film adhesion property and corrosion resistance in combination. Another example of the surface-treated steel plate will be a hard tin plate on which tin is plated at a rate of from 0.6 to 11.2 g/m². It is desired that the tin plate is subjected to the chromate treatment or to the chromate/phosphate treatment so that the amount of chromium is from 1 to 80 mg/m² reckoned as metal chromium.

As a further example, there can be used an aluminum-coated steel plate which is plated with aluminum or on which aluminum is adhered with pressure.

As a light metal plate, there can be used a so-called pure aluminum plate as well as an aluminum alloy plate. The aluminum alloy plate which is excellent both in corrosion resistance and workability has a composition of 0.2 to 1.5% by weight of manganese, 0.8 to 5% by weight of magnesium, 0.25 to 0.3% by weight of zinc, 0.16 to 0.26% by weight of copper, and the remainder of aluminum. It is desired that the light metal plate is subjected to the chromate treatment or to the chromate/phosphate treatment so that the amount of chromium is from 20 to 300 mg/m$^2$ reckoned as metal chromium.

The blank thickness of the metal plate, i.e., the thickness ($t_B$) of the can bottom portion may vary depending upon the kind of the metal, field where the container is used and the size of the container, but should generally be from 0.10 to 0.50 mm. Among them, the thickness should be from 0.10 to 0.30 mm in the case of a surface-treated steel plate and from 0.15 to 0.40 mm in the case of a light metal plate.

(Biaxially oriented polyester film)

The laminated plate used in the present invention is obtained by laminating a biaxially oriented polyester film on the metal substrate by heat-adhesion. Here, the film should have a biaxial orientation degree ($R_X$) expressed by $I_A/I_B$ of not smaller than 2.5 and, particularly, not smaller than 3. The film is prepared by molding a polyester comprising chiefly an ethylene terephthalate unit into a single-layer or a multi-layer film by the T-die method or the inflation method, biaxially drawing the film at a drawing temperature sequentially or simultaneously, and heat-setting the film that has been drawn.

As a starting polyester, there can be used a polyethylene terephthalate under limited conditions. From the standpoint of relaxing the orientation of the film of a portion corresponding to the can barrel portion and, besides, from the standpoint of heat-adhesiveness and resistance against the content, it is desired to introduce into the polyester a copolymerized ester unit other than the ethylene terephthalate. According to the present invention, it is particularly desired to use a biaxially drawn film of a copolymerized polyester having a melting point (peak temperature of heat absorption at melting in the differential thermal analysis) of from 210° to 252° C. and comprising chiefly an ethylene terephthalate unit and containing small amounts of other ester units. A homopolyethylene terephthalate has a melting point of generally from 255° to 265° C.

In the copolymerized polyester, in general, it is desired that not smaller than 70 mole % and, particularly, not smaller than 75 mole % of dibasic acid component is terephthalic acid component, and not smaller than 70 mole % and, particularly, not smaller than 75 mole % of diol component is ethylene glycol, and 1 to 30 mole % and, particularly, 5 to 25 mole % of dibasic acid component and/or diol component are dibasic acid component other than terephthalic acid and/or diol component other than ethylene glycol.

Examples of dibasic acid other than terephthalic acid include aromatic dicarboxylic acids such as isophthalic acid, phthalic acid, naphthalene dicarboxylic acid and the like; alicyclic dicarboxylic acids such as cyclohexane dicarboxylic acid and the like; and aliphatic dicarboxylic acids such as succinic acid, adipic acid, sebacic acid, dodecane dioic acid and the like, which can be used in a combination of one or two or more kinds. Examples of diol component other than ethylene glycol include ethylene oxide adducts such as propylene glycol, 1,4-butanediol, diethylene glycol, 1,6-hexylene glycol, cyclohexane dimethanol and bisphenol A, which can be used in one or two or more kinds. These comonomers should be used being so combined that the melting point of the copolymerized polyester lies within the above-mentioned range.

The polyester which is particularly advantageous from the standpoint of adhesiveness to metal, workability and preventing adsorption of flavor, comprises chiefly polyethylene terephthalate/isophthalate (PET/I).

By taking the dent resistance into consideration, furthermore, there can be used a multi-layer polyester, e.g., a two-layer polyester, the surface layer comprising chiefly PET/I and the lower layer being blended with a polybutylene terephthalate (PBT).

The polyester that is used should have a molecular weight large enough for forming a film and, hence, should have an intrinsic viscosity (I.V.) of from 0.50 to 1.9 dl/g and, particularly, from 0.55 to 1.4 dl/g.

It is important that the polyester film has been biaxially drawn. The degree of biaxial orientation can be confirmed even by the polarized fluorometric method, double refraction method or density-gradient tube method.

From the standpoint of barrier property against corrosive component and workability, furthermore, the film should have a thickness of from 5 to 50 μm and, particularly, from 8 to 40 μm.

The biaxially oriented film may be blended with widely known blending agents that are used for films, such as an anti-blocking agent like that of amorphous silica or the like, pigment like titanium dioxide (titanium white), various antistatic agents and lubricant according to recipe known per se.

The film is usually drawn at a temperature of from 80° to 110° C. into an area elongation of from 2.0 to 16.0 and, particularly, from 2.5 to 14.0, so that the ratio $I_A/I_B$ lies within the above-mentioned range in relation to the kind of polyester and other conditions.

The film is thermally set at a temperature of from 130° to 240° C. and, particularly, from 150° to 230° C., so that the above-mentioned conditions are satisfied.

(Preparation of a laminated material)

In the blank which is a metal-polyester laminated material used in the present invention, the polyester (A) of a portion corresponding at least to the bottom of the container is biaxially oriented. In general, the biaxial orientation degree ($I_A/I_B$) of the polyester (A) lies over a range of from 2.5 to 20 and, particularly, from 3 to 20.

The polyester (B) of a portion corresponding to the container barrel portion is relaxed for its biaxial orientation in advance at the time of preparing the laminated blank (blank relaxation method), or is relaxed for its monoaxial orientation in any step of deep-draw-forming, deep-draw-forming for reducing the thickness, or ironing effected in addition to the above steps (relaxation method during the forming).

In order for the biaxial orientation of the polyester film to be effectively remained, the polyester film and the metal substrate should be heat-adhered together at a temperature ($T_A$) which is close to the melting point (Tm) of the polyester and, generally, at a temperature of from Tm−50° C. to Tm+30° C. and, particularly, at a temperature of from Tm−30° C. to Tm+20° C. For this purpose, the surface of the metal substrate is maintained at the above-mentioned temperature, so that the metal substrate and the film are heat-adhered together under the application of pressure.

The metal substrate can be heated by a widely-known heating means such as electric heating, high-frequency induction heating, infrared-ray heating, heating in a hot-air furnace, heating by roller, etc. In order to accomplish the heat-adhesion within short periods of time, furthermore, the film to be heat-adhered may be preheated under a condition where the biaxial orientation is not substantially relaxed. The preheating temperature may be about 50° to 180° C.

The laminate after heat-adhered should be quenched as quickly as possible to prevent the biaxial orientation from being relaxed. The quenching is effected by blowing the cold air, sprinkling cooling water, immersing the laminate in the cold water, or bringing the laminate into contact with the quenching roller.

The metal substrate and the polyester film are heat-adhered over the whole surfaces under the above-mentioned condition, in order to obtain a laminate that can be used for the relaxation method during the forming.

In the blank relaxation method, in heat-adhering the metal substrate and the polyester film together, the portion corresponding to the container bottom portion is heat-adhered under the above-mentioned condition and the portion corresponding to the container barrel portion is heat-adhered under such a condition that the biaxial orientation of the polyester (B) of this portion is effectively relaxed and, generally, that the biaxial orientation degree ($I_A/I_B$) becomes smaller by at least 5% and, preferably, by at least 8% than that of the polyester (A).

For this purpose, the heat-adhesion is effected by maintaining the portion corresponding to the bottom portion of the metal plate at a relatively low temperature (above-mentioned temperature $T_A$) and maintaining the portion corresponding to the barrel portion at a relatively high temperature ($T_B$). The temperature ($T_B$) on the surface of the metal substrate of a portion corresponding to the barrel portion should be higher than the melting point (Tm °C.) of the polyester and, should be particularly, from Tm−10° C. to Tm+50° C., and most desirably, from Tm−5° C. to Tm+40° C.

In order to form the above-mentioned temperature distribution on the metal substrate that is to be adhered, the portion corresponding to the barrel should be heated in large amounts. This can be achieved by providing a heat source such as a heater for additionally heating the portion that corresponds to the barrel, or by bringing the metal substrate into contact with the heating roller having a pattern of the barrel portion or the heating stamper. Moreover, after the whole metal substrate is uniformly heated ($T_B$), the portion corresponding to the bottom may be quenched to the temperature ($T_A$). This is accomplished by bringing the metal plate after heated into contact with the quenching roller having a pattern corresponding to the container bottom or into contact with the quenching stamper.

In the blank relaxation method of the present invention, it should be understood that the boundary needs not be so strict between the portion corresponding to the bottom of a low temperature and the portion corresponding to the barrel of a high temperature. This is because it is the bottom portion that is favorably affected by the sustenance of biaxial orientation and, on the other hand, within the barrel portion it is the upper portion which is subjected to the severe working condition that is favorably affected by the relaxation of biaxial orientation. Intermediate portions between them are not so much affected.

If establishing the temperature distribution is not taken into consideration, the method of heat-adhesion is the same as the relaxation method during the forming.

According to another embodiment of blank relaxation method, the metal substrate on which the film is to be heat-adhered is uniformly heated at a temperature ($T_B$) and the polyester film is heat-adhered onto the thus heated metal substrate. In effecting the heat-adhesion, however, the adhered portion corresponding to the bottom is maintained at a temperature ($T_A$) lower than that of the adhered portion corresponding to the barrel. For this purpose, the press-adhering roller is provided with a patterned quenching mechanism (e.g., quenching mechanism using the cold water or the cold air) so that the portion corresponding to the bottom is preferentially cooled.

According to a further embodiment of blank relaxation method, the laminate is prepared by being heated in two stages. That is, the substrate on which the film is to be heat-adhered is first heated at the above-mentioned relatively low temperature ($T_A$) to heat-adhere the polyester film onto the metal substrate, and a portion of the obtained laminate corresponding to the barrel is heated at the above-mentioned high temperature ($T_B$) In order to relax the biaxial orientation in this portion.

According to the present invention, the time required for heat-adhering the polyester film and the time required for relaxing the biaxial orientation are very short; i.e., the above-mentioned temperatures need be maintained for 0.05 to 2 seconds.

According to the present invention, the polyester film can be heat-adhered to the metal substrate without using any particular adhesive to obtain a laminated material that can be subjected to the working such as deep-draw-forming, deep-draw-forming for reducing the thickness or ironing in addition to the above forming. As required, an adhesive primer may be interposed between them at the time of heat-adhesion, as a matter of course.

A representative example of the primer paint having excellent adhesiveness and corrosion resistance is a phenol epoxy-type paint comprising a bisphenol-type epoxy resin and a resol-type phenolaldehyde resin derived from various phenols and formaldehyde and, particularly, a paint which contains the phenol resin and epoxy resin at a weight ratio of from 50:50 to 5:95 and, particularly, from 40:60 to 10:90.

The adhesive primer layer should generally have a thickness of from 0.1 to 5 μm. The adhesive primer layer may be provided on the metal blank in advance or may be provided on the polyester film in advance.

When the adhesive primer is used, it is generally desired to treat the surface of the biaxially drawn copolyester film with corona discharge in order to enhance adhesiveness of the adhesive primer to the film. The treatment with corona discharge should be effected to such an extent that the wet tension is not smaller than 44 dyne/cm.

Moreover, the film may be treated for its surfaces for improving adhesiveness in a known manner such as treatment with plasma, treatment with frame, etc. or may be coated with a resin for improving adhesiveness such as urethane resin, modified polyester resin or the like resin.

According to the present invention, the seamless can is formed in a widely known manner such as deep-draw-forming, deep-draw-forming for reducing the thickness, or ironing effected in addition to the above forming.

(Deep-draw-forming for reducing the thickness)

Figure 10:
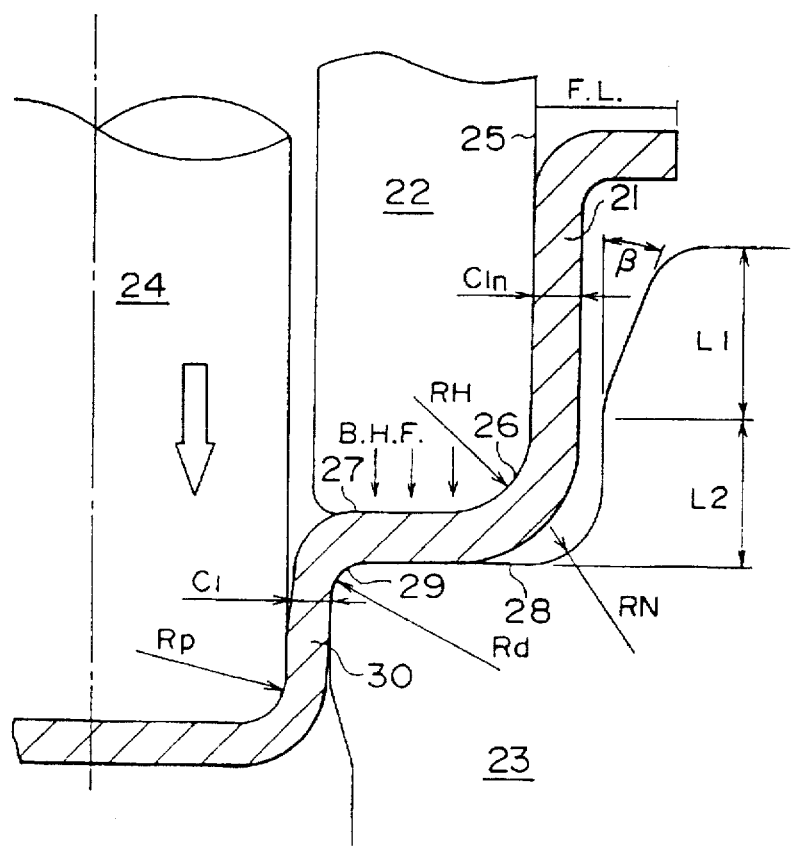
FIG. 10 is a diagram explaining the deep-draw-forming for reducing the thickness.

According to the deep-draw forming (draw-redraw forming) for reducing the thickness as shown, for example, in FIG. 10, a predraw-formed cup 21 obtained from the coated metal plate is held by an annular holding member 22 inserted in the cup and a redrawing die 23 located at a lower position. A redrawing punch 24 is provided in concentric with the holding member 22 and the redrawing die 23, so as to enter into and come out of the holding member 22. The redrawing punch 24 and the redrawing die 23 are moved relative to each other so as to be in mesh with each other.

The side wall portion of the predraw-formed cup 21 is vertically bent inwardly in the radial direction from the outer peripheral surface 25 of the annular holding member 22 through a curvature corner portion 26 thereof, passes through a portion defined by an annular bottom surface 27 of the annular holding member 22 and an upper surface 28 of the redrawing die 23, bent nearly vertically in the axial direction by the acting corner portion 29 of the redrawing die 23, formed into a deep-draw-formed cup 30 having a diameter smaller than that of the predraw-formed cup 21, and is further reduced for its thickness on the side wall portion by bend-elongation.

In a cup-shaped seamless can obtained by the deep-draw forming, deep-draw forming for reducing the thickness, or by ironing effected in addition to the above forming, the practical drawing ratio $R_D$ defined by the following relation, $$R_D = \frac{D}{d}$$

wherein D is a diameter of the laminated material that is sheared, and d is a diameter of the punch, should lie within a range of from 1.1 to 3.0 through one stage, and should lie within a range of from 1.5 to 5.0 as a total.

In order to improve corrosion resistance by the monoaxial orientation, furthermore, the forming is effected such that H/D (H:height, D:diameter of the bottom portion) is not smaller than 1.5.

According to the present invention in which the monoaxial orientation of the polyester in the barrel portion is relaxed, furthermore, the thickness of the barrel portion can be reduced to a high degree.

By using the ironing die in combination with the deep-draw forming for reducing the thickness, furthermore, the side wall portion of the cup is ironed to further reduce the thickness of the side wall portion. Even when the thickness is reduced by ironing, excellent corrosion resistance is maintained, which is an advantage of the present invention.

In the relaxation method during forming of the present invention, the barrel portion only is heated-treated in any step such as during the deep-draw forming, during deep-draw forming for reducing the thickness or during ironing effected in addition to the above forming, or between any of the above-mentioned steps, without interrupting the forming operations.

The heat treatment for relaxing the monoaxial orientation should be effected at a temperature of from Tm−20° C. to Tm+40° C. and, particularly, from Tm−10° C. to Tm+30° C. with the melting point (Tm) of the polyester as a reference. The orientation is relaxed within short periods of time on the high-temperature side and is relaxed needing longer periods of time on the low-temperature side. The orientation relaxes with an increase in the temperature hysteresis as a whole.

The barrel portion only of the draw-formed cup is advantageously heated by using infrared-ray heating or high-frequency induction heating.

(Seamless can)

In the seamless can according to the present invention, the polyester on the bottom portion of the container is biaxially oriented so as to have a biaxial orientation degree ($I_A/I_B$) of from 2.5 to 20, and the polyester of at least the upper portion of the container barrel portion has a monoaxial orientation degree which satisfies the aforementioned formula (2) or, desirably, the aforementioned formula (4).

The polyester film of the seamless can according to the present invention can be thermally set, and will have a crystallinity (X) of from 10 to 70% and, particularly, from 15 to 70% on the can bottom portion, and from 10 to 70% and, particularly, from 15 to 70% even on the can barrel portion (upper portion), the crystallinity varying depending upon the degree of biaxial or monoaxial orientation.

EXAMPLES

The invention will now be described in further detail by way of Examples.

In Examples and Comparative Examples, the container properties were evaluated and measured as described below.

(A) Biaxial orientation degree (X-ray diffraction intensity ratio): $I_A/I_B$

Measured in accordance with the method described in the specification.

(B) Monoaxial orientation degree: $<\cos^2\phi>$

Measured in accordance with the method described in the specification.

(C) Strain corresponding to working in a portion where the monoaxial orientation degree is measured: $\epsilon$ Measured in accordance with the method described in the specification.

(D) Forming property

Whitening of resin coating layer and peeling (delamination) are observed, exposure of metal (enamel rater value) is measured.

(E) Corrosion resistance

A can filled with a lowly acidic beverage is wrap-seamed, intentionally dented, preserved for long periods of time at 37° C. to measure the amount of eluted iron and to observe damage and corrosion of the coating layer on the inner surfaces of the can.

[Example 1]

A resin-coated metal sheet was obtained by heat-adhering a biaxially drawn polyethylene terephthalate (PET) film having a thickness of 20 μm on both surfaces of a tin-free steel (TFS) plate having a blank thickness of 0.18 mm and a tempering degree of DR-9. The temperatures of TFS during the heat-adhesion were 233° C. at portions corresponding to the lower portion and bottom portion of the final can and 247° C. at a portion corresponding to the upper part of can barrel, and the biaxial orientation degrees were as shown in Table.

A wax-type lubricant was applied onto the resin-coated metal sheet which was then punched into a disk having a diameter of 160 mm in order to obtain a shallow-draw-formed cup according to a customary manner. The drawing ratio in the drawing step was 1.59. Then, the primary and secondary redrawing steps (deep-draw-forming for reducing the thickness: A) were carried out under the following forming conditions.

Primary redrawing ratio 1.28

Secondary redrawing ratio 1.24

Redrawing die:

Radius of curvature (Rd) at working corner portion 0.30 mm

Radius of curvature (Rh) at holding corner portion 1.0 mm

The deep-draw-formed cup thus obtained was then subjected for its bottom portion to the doming. The deep-draw-formed cup exhibited the following properties.

Cup diameter: D 66 mm

Cup height: H 130 mm→H/D=1.97

Change in the thickness of side wall: −40%

The resin-coated deep-draw-formed cup was heated-treated without removing flange at 210° C. to effect dewaxing and heat setting, and was then subjected to the trimming, printing (at 210° C. for 15 seconds), necking and flanging, in order to obtain a deep-draw-formed seamless can having reduced thickness.

Table 1 shows properties and evaluation of the can.

As a result, it was made possible to obtain a deep-draw-formed seamless can having reduced thickness featuring excellent corrosion resistance and forming property.

[Comparative Example 1]

A resin-coated metal sheet was obtained by heat-adhering a biaxially drawn polyethylene terephthalate (PET) film having a thickness of 20 μm on both surfaces of a tin-free steel (TFS) plate having a blank thickness of 0.18 mm and a tempering degree of DR-9. The temperature of TFS during the heat-adhesion was 250° C. and was uniform over the whole surface. The biaxial orientation degree was uniform but was low as shown in Table.

By using the resin-coated metal sheet, a seamless can was obtained by the deep-draw-forming for reducing the thickness in the same manner as in Example 1.

Properties and evaluation of the can were as shown in Table.

The can having a biaxial orientation degree that fell outside the scope of the present invention exhibited good forming property but developed cracks in the coating on the inner surfaces and possessed inferior corrosion resistance.

[Comparative Example 2]

A resin-coated metal sheet was obtained by heat-adhering a biaxially drawn polyethylene terephthalate (PET) film having a thickness of 20 μm on both surfaces of a tin-free steel (TFS) plate having a blank thickness of 0.18 mm and a tempering degree of DR-9. The temperature of TFS during the heat-adhesion was 242° C. and was uniform over the whole surface. The biaxial orientation degree was uniform and was slightly high as shown in Table.

By using the resin-coated metal sheet, a seamless can was obtained by the deep-draw-forming for reducing the thickness in the same manner as in Example 1.

Properties and evaluation of the can were as shown in Table 1.

The can possessed a biaxial orientation degree on the bottom portion that fell within the scope of the present invention but possessed a monoaxial orientation degree that failed to satisfy the formula of the present invention, and, hence, exhibited poor forming property.

[Comparative Example 3]

A resin-coated metal sheet was obtained by heat-adhering a biaxially drawn polyethylene terephthalate (PET) film having a thickness of 20 μm on both surfaces of a tin-free steel (TFS) plate having a blank thickness of 0.18 mm and a tempering degree of DR-9. The temperature of TFS during the heat-adhesion was 285° C. and was uniform over the whole surface. The biaxial orientation degree was uniform and was slightly high as shown in Table.

By using the resin-coated metal sheet, a seamless can was obtained by the deep-draw-forming for reducing the thickness in the same manner as in Example 1.

Properties and evaluation of the can were as shown in Table 1.

The can possessed a biaxial orientation degree on the bottom portion that fell within the scope of the present invention but possessed a monoaxial orientation degree that failed to satisfy the formula of the present invention, and, hence, exhibited very poor forming property.

[Example 2]

A resin-coated metal sheet was obtained by heat-adhering a biaxially drawn polyethylene terephthalate (PET) film having a thickness of 20 μm on both surfaces of a tin-free steel (TFS) plate having a blank thickness of 0.18 mm and a tempering degree of DR-9. The temperature of TFS during the heat-adhesion was 235° C. and was uniform over the whole surface. The biaxial orientation degree was uniform and was slightly high as shown in Table.

By using the resin-coated metal sheet, a seamless can was obtained by the deep-draw-forming for reducing the thickness in the same manner as in Example 1 with the exception of heat-treating the wall portion only of the cup at 280° C. to relax the monoaxial orientation after the primary redrawing step has been finished and applying again the lubricating agent.

Properties and evaluation of the can were as shown in Table 1.

As a result, it was made possible to obtain a deep-draw-formed seamless can having reduced thickness featuring excellent corrosion resistance and forming property.

[Example 3]

A resin-coated metal sheet was obtained by heat-adhering a biaxially drawn polyethylene terephthalate (PET) film having a thickness of 20 μm on both surfaces of a tin-free steel (TFS) plate having a blank thickness of 0.18 mm and a tempering degree of DR-9. The temperatures of TFS during the heat-adhesion were 235° C. at portions corresponding to the lower portion and bottom portion of the final can and 238° C. at a portion corresponding to the upper part of can barrel, and the biaxial orientation degrees were as shown in Table.

By using the resin-coated metal sheet, a seamless can was obtained by the deep-draw-forming for reducing the thickness in the same manner as in Example 1 with the exception of heat-treating the wall portion only of the cup at 230° C. to relax the monoaxial orientation after the primary redrawing step has been finished and applying again the lubricating agent.

Properties and evaluation of the can were as shown in Table 1.

As a result, it was made possible to obtain a deep-draw-formed seamless can having reduced thickness featuring excellent corrosion resistance and forming property.

[Comparative Example 4]

By using a resin-coated metal sheet having the same biaxial orientation degrees as those of Example 3, a seamless can was obtained by the deep-draw forming in the same manner as in Example 1.

Properties and evaluation of the can were as shown in Table 1.

The can possessed a biaxial orientation degree on the bottom portion that fell within the scope of the present invention but possessed a monoaxial orientation degree that failed to satisfy the formula of the present invention, and, hence, exhibited poor forming property.

[Example 4]

A resin-coated metal sheet was obtained by heat-adhering a biaxially drawn polyethylene terephthalate (PET) film having a thickness of 20 μm on both surfaces of an aluminum alloy plate (3004H34) having a blank thickness of 0.23 mm. The temperatures of the aluminum alloy plate during the heat-adhesion were 233° C. at portions corresponding to the lower portion and bottom portion of the final can and 247° C. at a portion corresponding to the upper part of can barrel, and the biaxial orientation degrees were as shown in Table.

A wax-type lubricant was applied onto the resin-coated metal sheet which was then punched into a disk having a diameter of 165 mm in order to obtain a shallow-draw-formed cup according to a customary manner. The drawing ratio in the drawing step was 1.65. Then, the primary and secondary redrawing steps (deep-draw-forming for reducing the thickness: A) were carried out under the following forming conditions.

Primary redrawing ratio 1.23
Secondary redrawing ratio 1.24
Redrawing die:
 Radius of curvature (Rd) at working corner portion 0.33 mm
 Radius of curvature (Rh) at holding corner portion 1.2 mm The deep-draw-formed cup thus obtained was then subjected for its bottom portion to the doming. The deep-draw-formed cup exhibited the following properties.

Cup diameter: D 66 mm
Cup height: H 128 mm→H/D=1.94
Change in the thickness of side wall: −34%

The resin-coated deep-draw-formed cup was heat-treated without removing flange at 210° C. to effect dewaxing and heat setting, and was then subjected to the trimming, printing (at 210° C. for 15 seconds), necking and flanging, in order to obtain a deep-draw-formed seamless can having reduced thickness.

Table 1 shows properties and evaluation of the can.

As a result, it was made possible to obtain a deep-draw-formed seamless can having reduced thickness featuring excellent corrosion resistance and forming property even by using an aluminum alloy plate as a metal sheet.

[Example 5]

A resin-coated metal sheet was obtained by heat-adhering a biaxially drawn polyethylene terephthalate (PET) film having a thickness of 20 μm on both surfaces of a tin plate having a blank thickness of 0.20 mm. The temperatures of the tin plate during the heat-adhesion were 234° C. at portions corresponding to the lower portion and bottom portion of the final can and 245° C. at a portion corresponding to the upper part of can barrel, and the biaxial orientation degrees were as shown in Table.

By using the above resin-coated metal sheet, a seamless can was obtained by the deep-draw-forming for reducing the thickness in the same manner as in Example 1.

Table 1 shows properties and evaluation of the can.

As a result, it was made possible to obtain a deep-draw-formed seamless can having reduced thickness featuring excellent corrosion resistance and forming property even by using a tin plate as a metal sheet.

[Example 6]

Use was made of the same resin-coated metal sheet as that of Example 1. After having applied a wax-type lubricant, the resin-coated metal sheet was punched into a disk having a diameter of 155 mm in order to obtain a shallow-draw-formed cup according to a customary manner. The drawing ratio in the drawing step was 1.55. Then, the primary and secondary redrawing steps were carried out under the following forming conditions to reduce the thickness of the side wall to some extent. In the secondary redrawing step, an ironing ring was also used to reduce the thickness in order to accomplish a desired H/D (cup-forming method: B).

Primary redrawing ratio 1.23
Secondary redrawing ratio 1.24
Redrawing die:
 Radius of curvature (Rd) at working corner portion 0.35 mm
 Radius of curvature (Rh) at holding corner portion 1.5 mm
Ironing die clearance 0.10 mm The deep-draw-formed cup obtained through the deep-draw-forming for reducing the thickness and the ironing was then subjected for its bottom portion to the doming. The deep-draw-formed cup exhibited the following properties.

Cup diameter: D 66 mm
Cup height: H 132 mm→H/D=2.00
Change in the thickness of side wall: −45%

The resin-coated deep-draw-formed cup was heat-treated without removing flange at 210° C. to effect dewaxing and heat setting, and was then subjected to the trimming, printing (at 210° C. for 15 seconds), necking and flanging, in order to obtain a deep-draw-formed seamless can having reduced thickness.

Table 1 shows properties and evaluation of the can.

As a result, it was made possible to obtain a deep-draw-formed seamless can having excellent corrosion resistance and forming property even when the thickness of the metal blank was further reduced by ironing in addition to the deep-draw-forming (deep-draw-forming for reducing thickness -ironing: B).

[Example 7]

Use was made of the same resin-coated metal sheet as that of Example 4. After having applied a wax-type lubricant, the resin-coated metal sheet was punched into a disk having a diameter of 155 mm. The blank was shallow-draw-formed into a cup according to a customary manner and was then subjected to the redraw-forming in a customary manner to accomplish a desired cup diameter. Ironing was further effected to obtain a desired cup height while maintaining the cup diameter unchanged (so-called DI forming: C). The drawing, redrawing and ironing steps were carried out under the following conditions.

Drawing ratio 1.65
Redrawing ratio 1.42
Drawing die:
 Radius of curvature (Rd) at working corner portion 2.0 mm
Redrawing die:
 Radius of curvature (Rd) at working corner portion 1.5 mm
 Radius of curvature (Rh) at holding corner portion 2.0 mm
Ironing die clearance 0.15 mm The deep-draw-formed cup obtained through the draw-forming and the ironing was then subjected for its bottom portion to the doming. The deep-draw-formed cup exhibited the following properties.

Cup diameter: D 66 mm

Cup height: H 135 mm→H/D=2.05

Change in the thickness of side wall: −45%

The resin-coated deep-draw-formed cup was heated-treated at 210° C. to effect dewaxing and heat setting, and was then subjected to the trimming, printing (at 210° C. for 15 seconds), necking and flanging, in order to obtain a seamless can through the draw-forming and ironing.

Table 1 shows properties and evaluation of the can.

As a result, it was made possible to obtain a seamless can having excellent corrosion resistance and forming property even by effecting the ironing after the draw-forming and redraw-forming, i.e., even through the draw-forming and ironing.

[Example 8]

A resin-coated metal sheet was obtained by heat-adhering a biaxially drawn polyethylene terephthalate (PET) film having a thickness of 20 μm on both surfaces of an aluminum alloy plate (3004H34) having a blank thickness of 0.23 mm. The temperature of the aluminum alloy plate during the heat-adhesion was 233° C. and was uniform over the whole surface, and the biaxial orientation degree was as shown in Table.

By using the above resin-coated metal sheet, a seamless can was obtained by ironing in the same manner as in Example 7 with the exception of heat-treating the wall portion only of the cup at 225° C. to relax the monoaxial orientation after the step of draw-forming and applying the lubricant again.

Table 1 shows properties and evaluation of the can.

As a result, it was made possible to obtain a seamless can having excellent corrosion resistance and forming properties even by the relaxation method during the draw-forming and ironing.

[Example 9]

A resin-coated metal sheet was obtained by heat-adhering a biaxially drawn polyethylene terephthalate (PET) film having a thickness of 20 μm on both surfaces of an aluminum alloy plate (3004H34) having a blank thickness of 0.23 mm. The temperature of the aluminum alloy plate during the heat-adhesion was 233° C. and was uniform over the whole surface. Thereafter, the portion corresponding to the container barrel was heated again by the high-frequency induction heating to lower the biaxial orientation degrees of the polyester. The biaxial orientation degrees were as shown in Table.

By using the above resin-coated metal sheet, a seamless can was obtained by draw-forming and ironing in the same manner as in Example 7.

Table 1 shows properties and evaluation of the can.

As a result, it was made possible to obtain a seamless can through the draw-forming and ironing, the seamless can having excellent corrosion resistance and forming properties even by the blank relaxation method by heating again the laminate.

[Example 10]

Use was made of the same resin-coated metal sheet as that of Example 4. After having applied a wax-type lubricant, the resin-coated metal sheet was punched into a disk having a diameter of 181 mm. The blank was shallow-draw-formed into a cup according to a customary manner and was then subjected to the redraw-forming three times in a customary manner to accomplish a desired cup diameter (deep-draw-forming: D). The draw-forming and redraw-forming steps were carried out under the following conditions.

Drawing ratio 1.46

Redrawing ratios 1.24→1.24→1.22

Drawing die:
  Radius of curvature (Rd) at working corner portion 2.0 mm

Redrawing die:
  Radius of curvature (Rd) at working corner portion 1.5 mm
  Radius of curvature (Rh) at holding corner portion 2.0 mm The deep-draw-formed cup obtained through the draw-forming and redraw-forming was then subjected for its bottom portion to the doming. The deep-draw-formed cup exhibited the following properties.

Cup diameter: D 66 mm

Cup height: H 100 mm→H/D=1.51

Change in the thickness of side wall: +8%

The resin-coated deep-draw-formed cup was heated-treated at 210° C. to effect dewaxing and heat setting, and was then subjected to the trimming, printing (at 210° C. for 15 seconds), necking and flanging, in order to obtain a seamless can through the deep-draw-forming.

Table 1 shows properties and evaluation of the can.

As a result, it was made possible to obtain a seamless can having excellent corrosion resistance and forming property even by effecting the deep-draw-forming relying upon the draw-forming and redraw-forming.

TABLE 1

Properties and evaluation of seamless cans:

| Run No. | Metal sheet | Polyester film Resin composition | Melting point °C. | Biaxial orientation deg. $I_A/I_B$ Can bottom | Laminated plate corres. to barrel | Cup-forming method | Temp. of hot step °C. Relax of monoaxial orientation | Cure printing |
|---|---|---|---|---|---|---|---|---|
| Example 1 | TFS | PET/I | 230 | 4.4 | 2.4 | A | — | 210 |
| Comp. Ex. 1 | TFS | PET/I | 230 | 1.1 | 1.1 | A | — | 210 |
| Comp. Ex. 2 | TFS | PET/I | 230 | 3.5 | 3.5 | A | — | 210 |
| Comp. Ex. 3 | TFS | PET/I | 230 | 4.2 | 4.2 | A | — | 210 |
| Example 2 | TFS | PET/I | 230 | 4.2 | 4.2 | A | 230 | 210 |
| Example 3 | TFS | PET/I | 230 | 4.2 | 4.0 | A | 230 | 210 |

TABLE 1-continued

| | | | Properties and evaluation of seamless cans: | | | | | |
|---|---|---|---|---|---|---|---|---|
| Comp. Ex. 4 | TFS | PET/I | 230 | 4.2 | 4.0 | A | — | 210 |
| Example 4 | Al | PET/I | 230 | 4.0 | 2.0 | A | — | 210 |
| Example 5 | tin plate | PET/I | 230 | 4.0 | 2.4 | A | — | 210 |
| Example 6 | TFS | PET/I | 230 | 4.4 | 2.4 | B | — | 210 |
| Example 7 | Al | PET/I | 230 | 4.0 | 2.0 | C | — | 210 |
| Example 8 | Al | PET/I | 230 | 4.0 | 4.0 | C | 225 | 210 |
| Example 9 | Al | PET/I | 230 | 4.0 | 0.8 | C | — | 210 |
| Example 10 | Al | PET/I | 230 | 4.0 | 2.0 | D | — | 210 |

| | Monoaxial orientation | | | | | |
|---|---|---|---|---|---|---|
| | Strain $\epsilon$ in measured | $<\cos^2\phi>$ | | Forming | Corrosion resistance | |
| Run No. | portion | Measured | Calculated | properties | Bottom | Barrel |
| Example 1 | 1.15 | 0.83 | 0.93 | normal | normal | normal |
| Comp. Ex. 1 | 1.15 | 0.73 | 0.71 | normal | film cracked | normal |
| Comp. Ex. 2 | 1.15 | 0.91 | 0.90 | upper portion whitened | normal | UFC |
| Comp. Ex. 3 | 1.15 | 0.92 | 0.93 | film broken | not evaluated | |
| Example 2 | 1.15 | 0.67 | 0.93 | normal | normal | normal |
| Example 3 | 1.15 | 0.65 | 0.93 | normal | normal | normal |
| Comp. Ex. 4 | 1.15 | 0.92 | 0.93 | film broken | not evaluated | |
| Example 4 | 1.05 | 0.78 | 0.91 | normal | normal | normal |
| Example 5 | 1.15 | 0.84 | 0.92 | normal | normal | normal |
| Example 6 | 1.22 | 0.85 | 0.94 | normal | normal | normal |
| Example 7 | 1.25 | 0.83 | 0.93 | normal | normal | normal |
| Example 8 | 1.25 | 0.63 | 0.93 | normal | normal | normal |
| Example 9 | 1.25 | 0.70 | 0.93 | normal | normal | normal |
| Example 10 | 0.98 | 0.76 | 0.90 | normal | normal | normal |

We claim:

1. A seamless can obtained by forming a laminated material of a metal and a polyester film into a cup such that a final draw ratio defined by H/D, where H is equal to said can's height and D is equal to the diameter of said can's bottom portion, is not smaller than 1.5, wherein a polyester (A) on the bottom portion of the can has a biaxial orientation degree Rx defined by the following formula, $$Rx = I_A/I_B$$

wherein $I_A$ is a diffraction intensity by a diffraction plane having a spacing of about 0.34 nm CuKα X-ray diffraction angle is from 24° to 28° in parallel with the polyester film surface on the bottom portion, and $I_B$ is a diffraction intensity by a diffraction plane having a spacing of about 0.39 nm, where the CuKα X-ray diffraction angle is from 21.5° to 24° in parallel with the polyester film surface on the bottom portion;

of from 2.5 to 20, and a polyester (B) on the barrel portion of the can has a monoaxial orientation satisfying the following formula, $$0.6 < \cos^2\phi < 0.95 - \exp[-0.45 I_A/I_B - 1.1\epsilon + 0.53]$$

wherein $\cos^2\phi$ is an index representing the degree of monoaxial orientation of the polyester film at a portion where the barrel portion is measured, and is given by the formula, $$\cos^2\phi = \frac{\int_{-90°}^{+0°} I(\phi)\cos^2\phi d\phi}{\int_{-90°}^{+0°} I(\phi)d\phi}$$

wherein (Iφ) is an X-ray diffraction intensity at an angle φ by a diffraction plane having a plane index of −105 and having a spacing of about 0.21 nm, where the CuKα X-ray diffraction angle of from 41° to 45° at right angles with the polyester film surface, φ is a value represents by the β-scanning angle of X-ray diffraction up to −90° presuming that the angle of structural inclination between a vector of a normal on the diffraction plane and the polyester fiber axis is zero with respect to the height direction of the can, $I_A$ is a diffraction intensity by a diffraction plane having a spacing of about 0.34 nm, wherein the CuKα X-ray diffraction angle of from 24° to 28° in parallel with the polyester film surface on the bottom portion of the can, $I_B$ is a diffraction intensity by a diffraction plane having a spacing of about 0.39 nm, where the CuKα X-ray diffraction angle of from 21.5° to 24° in parallel with the polyester film surface on the bottom portion of the can, and $\epsilon$ is a considerable strain by the processing of the laminated material at the can body measuring portion, and that the thickness of the barrel portion is reduced by more than 30%.

2. A seamless can according to claim 1, wherein said polyester (A) has a crystallinity (X) of from 10 to 70% on the bottom portion and said polyester (B) has a crystallinity (X) of from 10 to 70% on the barrel portion.

3. A seamless can according to claim 1, wherein said polyesters (A) and (B) are a copolymerized polyester having a melting point of from 210° to 252° C.

4. A seamless can obtained by forming a laminated material of a metal and a polyester film into a cup such that a final draw ratio defined by H/D, where H is equal to said can's height and D is equal to the diameter of said can's bottom portion, is not smaller than 1.5, wherein a polyester (A) on the bottom portion of the can has a biaxial orientation degree $R_X$ defined by the following formula $$R_X = I_A/I_B$$

wherein $I_A$ is a diffraction intensity by a diffraction plane having a spacing of about 0.34 nm, where a CuKα X-ray diffraction angle is from 24° to 28° in parallel with the polyester film surface on the bottom portion, and $I_B$ is a diffraction intensity by a diffraction plane having a spacing of about 0.39 nm, where the CuKα X-ray diffraction angle is from 21.5° to 24° in parallel with the polyester film surface on the bottom portion, of from 2.5 to 20, and a polyester (B) on a barrel portion of the can has a monoaxial orientation satisfying the following formula $$0.6 < \cos^2 \phi < 0.95 - \exp[-0.45 I_A/I_B - 1.1 \epsilon 0.53]$$

wherein $\cos^2 \phi$ is an index representing the degree of monoaxial orientation of the polyester film at a portion where the barrel portion is measured, and is given by the formula, $$\cos^2 \phi = \frac{\int_{-90°}^{+0°} I(\phi) \cos^2 \phi \, d\phi}{\int_{-90°}^{+0°} I(\phi) \, d\phi}$$

wherein $I(\phi)$ is an X-ray diffraction intensity at an angle $\phi$ by a diffraction plane having a plane index of −105 and a spacing of about 0.21 nm, where the CuKα X-ray diffraction angle is from 41° to 45° at right angles with the polyester film surface, $\phi$ is a value represented by a β-scanning angle of X-ray diffraction of up to −90° presuming that the angle of structural inclination between a vector of a normal on the diffraction plane and the polyester fiber axis is zero with respect to the direction of height of the can, $I_A$ is a diffraction intensity by a diffraction plane having a spacing of about 0.34 nm, where the CuKα X-ray diffraction angle is from 24° to 28° in parallel with the polyester fill surface on the bottom portion of the can, $I_B$ is a diffraction intensity by a diffraction plane having a spacing of about 0.39 nm, where the CuKα X-ray diffraction angle is from 21.5° to 24° in parallel with the polyester film surface on the bottom portion of the can, and ε is a considerable strain by the processing of the laminated material at the can body measuring portion.

\* \* \* \* \*